United States Patent
Kim (10) Patent No.: US 11,695,441 B2
(45) Date of Patent: Jul. 4, 2023

(54) METHOD AND APPARATUS FOR CANCELLING INTERFERENCE SIGNALS

(71) Applicant: Electronics and Telecommunications Research Institute, Daejeon (KR)

(72) Inventor: Jung Bin Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/540,715

(22) Filed: Dec. 2, 2021

(65) Prior Publication Data
US 2022/0182089 A1    Jun. 9, 2022

(30) Foreign Application Priority Data

Dec. 4, 2020 (KR) .................. 10-2020-0168926
Nov. 18, 2021 (KR) .................. 10-2021-0159235

(51) Int. Cl.
*H04B 1/12* (2006.01)

(52) U.S. Cl.
CPC ..................... *H04B 1/12* (2013.01)

(58) Field of Classification Search
CPC ..................................... H04B 1/12
See application file for complete search history.

(56) References Cited

U.S. PATENT DOCUMENTS

| | | | |
|---|---|---|---|
| 4,637,067 A | 1/1987 | Steinberger | |
| 5,760,740 A | 6/1998 | Blodgett | |
| 5,966,102 A | 10/1999 | Runyon | |
| 6,064,338 A * | 5/2000 | Kobayakawa | H04B 7/0837 |
| | | | 342/383 |
| 8,665,771 B2 | 3/2014 | Nam et al. | |
| 8,755,833 B2 | 6/2014 | Anreddy et al. | |
| 9,105,986 B2 | 8/2015 | Mahanfar et al. | |
| 9,503,171 B2 | 11/2016 | Yeh et al. | |

(Continued)

FOREIGN PATENT DOCUMENTS

KR    10-1708381    2/2017

OTHER PUBLICATIONS

Thomas Kraus et al., "Use of the Signal Polarization for Anti-jamming and Anti-spoofing with a Single Antenna", Proceedings of the 27th International Technical Meeting of the ION Satellite Division, Sep. 8-12, 2014, pp. 3495-3501.

*Primary Examiner* — Junpeng Chen
(74) *Attorney, Agent, or Firm* — Kile Park Reed & Houtteman PLLC (57) ABSTRACT

A method of cancelling interference signals may comprise: receiving, from a transmitting communication node, a first polarization signal including an interference signal and a second polarization signal that is orthogonal to the first polarization signal and includes the interference signal; generating a combined signal by combining the first polarization signal and the second polarization signal using initial combining coefficients; calculating a correlation between the combined signal and one of the first polarization signal and the second polarization signal; selecting final combining coefficients based on the correlation; and generating an output signal by combining the first polarization signal and the second polarization signal using the final combining coefficients.

14 Claims, 6 Drawing Sheets

(56) References Cited

U.S. PATENT DOCUMENTS

| | | | |
|---|---|---|---|
| 2003/0114194 A1* | 6/2003 | Hiramatsu | H04B 7/0691 |
| | | | 455/562.1 |
| 2004/0017309 A1* | 1/2004 | Bortnyk | H04B 7/0857 |
| | | | 342/194 |
| 2015/0263821 A1* | 9/2015 | Lee | H04J 14/06 |
| | | | 370/316 |
| 2020/0411992 A1 | 12/2020 | Shin et al. | |

* cited by examiner

METHOD AND APPARATUS FOR CANCELLING INTERFERENCE SIGNALS

CROSS-REFERENCE TO RELATED APPLICATIONS

This application claims priority to Korean Patent Applications No. 10-2020-0168926 filed on Dec. 4, 2020 and No. 10-2021-0159235 filed on Nov. 18, 2021 with the Korean Intellectual Property Office (KIPO), the entire contents of which are hereby incorporated by reference.

BACKGROUND

1. Technical Field

Exemplary embodiments of the present disclosure relate to a technique for cancelling interference signals, and more particularly, to an interference signal cancellation technique for cancelling multi-path interference signals in a transceiving system using orthogonal polarization.

2. Related Art

The communication system (e.g., new radio (NR) communication system or 6G communication system) using a higher frequency band (e.g., frequency band of 6 GHz or above) than a frequency band (e.g., frequency band of 6 GHz or below) of the long term evolution (LTE) communication system (or, LTE-A communication system) is being considered for processing of soaring wireless data. The NR communication system and/or 6G communication system may support not only a frequency band of 6 GHz or below, but also a frequency band of 6 GHz or above, and may support various communication services and scenarios compared to the LTE system. For example, usage scenarios of the NR communication system may include enhanced Mobile BroadBand (eMBB), Ultra Reliable Low Latency Communication (URLLC), and Massive Machine Type Communication (mMTC).

On the other hand, some transceiving systems may use orthogonal polarization signals having the advantage of reducing influence of interference signals or increasing a transmission rate in a specific environment. Such the orthogonal polarization signals may be impaired in orthogonality in a multi-path environment. In addition, spoofing signals, jamming signals, and other system signals transmitted from the ground and passing through a multi-path channel may act as interference signals to the orthogonal polarization signals, thereby impairing the orthogonality of the orthogonal polarization signals. Such the interference signals may increase a reception error rate in the transceiving system, decrease the transmission rate, and decrease accuracy of a navigation solution, thereby degrading the overall performance of the system.

SUMMARY

Accordingly, exemplary embodiments of the present disclosure are provided to substantially obviate one or more problems due to limitations and disadvantages of the related art. Exemplary embodiments of the present disclosure provide methods and apparatuses for cancelling multi-path interference signals in a transceiving system using orthogonal polarization.

According to a first exemplary embodiment of the present disclosure, a method of cancelling interference signals, performed by a communication node, may comprise: receiving, from a transmitting communication node, a first polarization signal including an interference signal and a second polarization signal that is orthogonal to the first polarization signal and includes the interference signal; generating a combined signal by combining the first polarization signal and the second polarization signal using initial combining coefficients; calculating a correlation between the combined signal and one of the first polarization signal and the second polarization signal; selecting final combining coefficients based on the correlation; and generating an output signal by combining the first polarization signal and the second polarization signal using the final combining coefficients.

The first polarization signal may be a right hand circular polarization (RHCP) signal, and the second polarization signal may be a left hand circular polarization (LHCP) signal.

The first polarization signal may be a vertical polarization signal, and the second polarization signal may be a horizontal polarization signal.

The interference signal may include at least one of a jamming signal, a spoofing signal, a multi-path signal, an interference signal from another system, and combinations thereof.

The calculating of the correlation may comprise: selecting a polarization signal having a larger magnitude by comparing magnitudes of the first polarization signal and the second polarization signal; and calculating the correlation between the selected polarization signal and the combined signal.

The selecting of the final combining coefficients may comprise: comparing the correlation with a threshold; and in response to the correlation being less than the threshold, determining the initial combining coefficients as the final combining coefficients.

The selecting of the final combining coefficients may further comprise: in response to the correlation being greater than or equal to the threshold, calculating first updated combining coefficients by updating the initial combining coefficients; generating a first updated combined signal by updating the combined signal using the first updated combining coefficients; generating a first updated correlation by updating the correlation using the first updated combined signal; comparing the first updated correlation with the threshold; and in response to the first updated correlation being less than the threshold, determining the first updated combining coefficients as the final combining coefficients.

The selecting of the final combining coefficients may further comprise: in response to the first updated correlation being greater than or equal to the threshold, calculating second updated combining coefficients by updating the first updated combining coefficients; generating a second updated combined signal by updating the first updated combined signal using the second updated combining coefficients; generating a second updated correlation by updating the first updated correlation using the second updated combined signal; comparing the second updated correlation with the threshold; and in response to the second updated correlation being less than the threshold, determining the second updated combining coefficients as the final combining coefficients.

According to a second exemplary embodiment of the present disclosure, an apparatus for interference signal cancellation in a communication node may comprise: a processor; a memory configured to electronically communicate with the processor; and instructions stored in the memory, wherein when executed by the processor, the instructions cause the apparatus to: receive, from a transmitting communication node, a first polarization signal including an interference signal and a second polarization signal that is orthogonal to the first polarization signal and includes the interference signal; generate a combined signal by combining the first polarization signal and the second polarization signal using initial combining coefficients; calculate a correlation between the combined signal and one of the first polarization signal and the second polarization signal; select final combining coefficients based on the correlation; and generate an output signal by combining the first polarization signal and the second polarization signal using the final combining coefficients.

The first polarization signal may be a right hand circular polarization (RHCP) signal, and the second polarization signal may be a left hand circular polarization (LHCP) signal.

The interference signal may include at least one of a jamming signal, a spoofing signal, a multi-path signal, an interference signal from another system, and combinations thereof.

In the calculating of the correlation, the instructions further cause the apparatus to: select a polarization signal having a larger magnitude by comparing magnitudes of the first polarization signal and the second polarization signal; and calculate the correlation between the selected polarization signal and the combined signal.

In the selecting of the final combining coefficients, the instructions may further cause the apparatus to: compare the correlation with a threshold; and in response to the correlation being less than the threshold, determine the initial combining coefficients as the final combining coefficients.

In the selecting of the final combining coefficients, the instructions may further cause the apparatus to: in response to the correlation being greater than or equal to the threshold, calculate first updated combining coefficients by updating the initial combining coefficients; generate a first updated combined signal by updating the combined signal using the first updated combining coefficients; generate a first updated correlation by updating the correlation using the first updated combined signal; compare the first updated correlation with the threshold; and in response to the first updated correlation being less than the threshold, determine the first updated combining coefficients as the final combining coefficients.

According to the exemplary embodiments of the present disclosure, a transceiving system using orthogonal polarization can effectively cancel interference signals such as spoofing signals, jamming signals, other system signals, and multi-path signals. In addition, according to the exemplary embodiments of the present disclosure, the transceiving system using orthogonal polarization can effectively cancel interference signals that are larger than a desired signal but smaller than noises, which are difficult to cancel. In addition, according to the exemplary embodiments of the present disclosure, the transceiving system can effectively cancel the interference signals in an environment in which orthogonality is impaired in the interference signals of orthogonal polarization. Further, according to the exemplary embodiments of the present disclosure, the transceiving system can effectively cancel the interference signals that do not use orthogonal polarization. In addition, according to the exemplary embodiments of the present disclosure, the transceiving system can effectively cancel the interference signals in an environment in which the interference signals are received through a multi-path channel. Further, according to the exemplary embodiments of the present disclosure, the transceiving system can effectively cancel a multi-path signal in an environment in which a desired signal is received through a multi-path channel and causes interferences.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Throughout the present disclosure, a 'network' may include, for example, a wireless Internet such as Wi-Fi, a portable Internet such as wireless broadband internet (WiBro) or world interoperability for microwave access (WiMax), a 3rd generation (3G) mobile communication network such as global system for mobile communication (GSM), code division multiple access (CDMA), or CDMA2000, a 3.5th generation (3.5G) mobile communication network such as high speed downlink packet access (HSDPA) or high speed uplink packet access (HSUPA), a 4th generation (4G) mobile communication network such as long term evolution (LTE) or LTE-Advanced, a 5th generation (5G) mobile communication network, and/or the like.

Throughout the present disclosure, a 'terminal' may refer to a mobile station, mobile terminal, subscriber station, portable subscriber station, user equipment, access terminal, and/or the like, and may include all or some functions of the terminal, mobile station, mobile terminal, subscriber station, portable subscriber station, user equipment, access terminal, and/or the like.

The terminal may refer to a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video player, or the like that has communication capability and that a mobile communication service user can use.

Throughout the present disclosure, a 'base station' may refer to an access point, radio access station, NodeB, evolved NodeB, base transceiver station, mobile multi-hop relay-base station (MMR-BS), and/or the like, and may include all or some functions of the base station, access point, wireless access station, NodeB, evolved NodeB, base transceiver station, MMR-BS, and/or the like.

Figure 1:
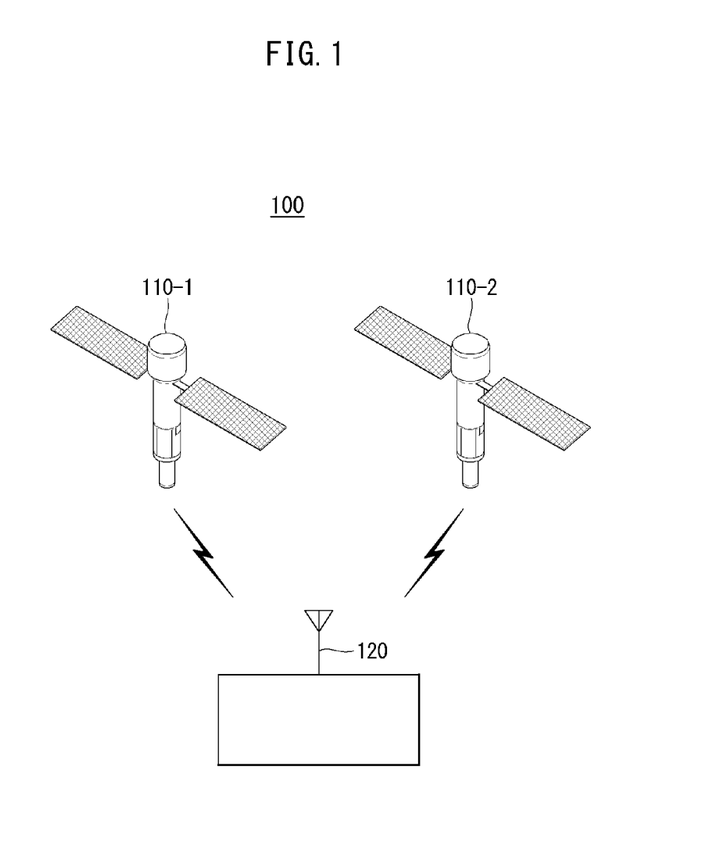
FIG. 1 is a conceptual diagram illustrating a first exemplary embodiment of a satellite navigation system.

FIG. 1 is a conceptual diagram illustrating a first exemplary embodiment of a satellite navigation system.

Referring to FIG. 1, a satellite navigation system 100 may include satellites 110-1 and 110-2 and a communication node 120. Each of the satellites 110-1 and 110-2 may be a global positioning system (GPS) satellite, a Galileo satellite, a global navigation satellite system (GLONASS), a navigation indian constellation (NavIC), a beidou navigation satellite system (BDS), a quasi-zenith satellite system (QZSS), or an Indian regional navigational satellite system (IRNSS) satellite. Such the satellites 110-1 and 110-2 may broadcast navigation signals to the communication node 120 located on the ground in real time. In this case, the satellites 110-1 and 110-2 may use orthogonal polarization signals. Meanwhile, the communication node 120 may include a terrestrial communication node (e.g., user equipment (UE), terminal, etc.) and a non-terrestrial communication node (e.g., airplane, drone, etc.). The communication node 120 may receive the navigation signals from the satellites 110-1 and 110-2 to determine a position thereof.

Figure 2:
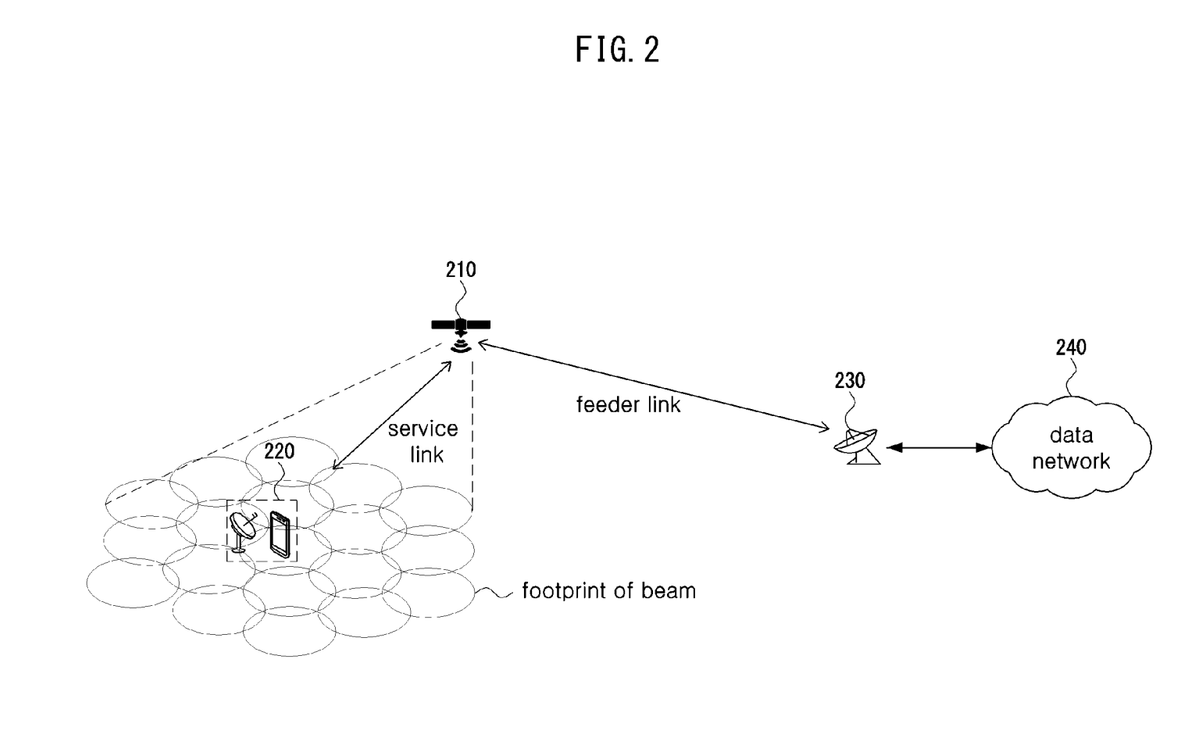
FIG. 2 is a conceptual diagram illustrating a first exemplary embodiment of a satellite communication system.

FIG. 2 is a conceptual diagram illustrating a first exemplary embodiment of a satellite communication system.

Referring to FIG. 2, a satellite communication system may include a satellite 210, a communication node 220, a gateway 230, a data network 240, and the like. The satellite communication system shown in FIG. 2 may be a transparent payload-based non-terrestrial network (NTN). The satellite 210 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 220 may include a terrestrial communication node (e.g., UE, terminal, etc.) and a non-terrestrial communication node (e.g., airplane, drone, etc.). A service link may be established between the satellite 210 and the communication node 220, and the service link may be a radio link. The satellite 210 may provide communication services to the communication node 220 by using one or more beams. The footprint shape of the beam of the satellite 210 may be elliptical. The satellite 210 may divide the entire available band into several partial bands. In addition, the satellite 210 may transmit signals by applying different polarizations such as right-hand circular polarization (RHCP) and left-hand circular polarization (LHCP) to the several divided subbands.

The communication node 220 may perform communications (e.g., downlink communication and uplink communication) with the satellite 210 using the LTE technology and/or NR technology. The communications between the satellite 210 and the communication node 220 may be performed using an NR-Uu interface. When dual connectivity (DC) is supported, the communication node 220 may be connected to the satellite 210 as well as other base stations (e.g., base stations supporting the LTE and/or NR functions), and may perform DC operations based on the techniques defined in the LTE and/or NR technical specifications.

A gateway 230 may be located on the ground, and a feeder link may be established between the satellite 210 and the gateway 230. The feeder link may be a radio link. The gateway 230 may be referred to as a 'non-terrestrial network (NTN) gateway'. Communications between the satellite 210 and the gateway 230 may be performed based on an NR-Uu interface or a satellite radio interface (SRI). The gateway 230 may be connected to a data network 240. A 'core network' may exist between the gateway 230 and the data network 240. In this case, the gateway 230 may be connected to the core network, and the core network may be connected to the data network 240. The core network may support the NR technology. For example, the core network may include an access and mobility management function (AMF), a user plane function (UPF), a session management function (SMF), and the like. Communications between the gateway 230 and the core network may be performed based on an NG-C/U interface.

Alternatively, a base station and the core network may exist between the gateway 230 and the data network 240. In this case, the gateway 230 may be connected to the base station, the base station may be connected to the core network, and the core network may be connected to the data network 240. The base station and core network may support the NR technology. Communications between the gateway 230 and the base station may be performed based on an NR-Uu interface, and communications between the base station and the core network (e.g., AMF, UPF, or SMF) may be performed based on an NG-C/U interface.

Figure 3:
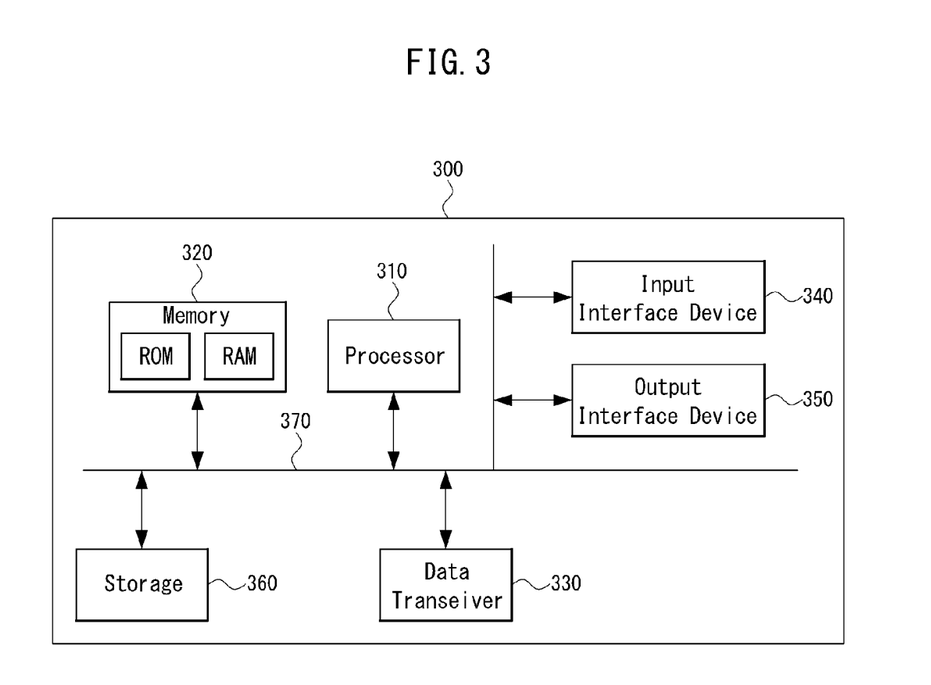
FIG. 3 is a block diagram illustrating a first exemplary embodiment of a communication node.

FIG. 3 is a block diagram illustrating a first exemplary embodiment of a communication node.

Referring to FIG. 3, a communication node 300 may comprise at least one processor 310, a memory 320, and a transceiver 330 connected to the network for performing communications. Also, the communication node 300 may further comprise an input interface device 340, an output interface device 350, a storage device 360, and the like. The respective components included in the communication node 300 may communicate with each other as connected through a bus 370.

However, each component included in the communication node 300 may be connected to the processor 310 via an individual interface or a separate bus, rather than the common bus 370. For example, the processor 310 may be connected to at least one of the memory 320, the transceiver 330, the input interface device 340, the output interface device 350, and the storage device 360 via a dedicated interface.

The processor 310 may execute a program stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

On the other hand, as described above, a transceiving system used in the satellite navigation system and the satellite communication system may have an advantage of reducing influence of interference signals or increasing a transmission rate in a specific environment by using orthogonal polarization signals. For example, the satellite navigation system may use a right-hand circular polarization (RHCP) signal as a transmission/reception signal. As another example, the satellite communication system may use an RHCP signal and a left-hand circular polarization (LHCP) signal, or may use a vertical polarization signal and a horizontal polarization signal. Of course, some terrestrial communication systems may also use the orthogonal polarization signals to reduce the influence of interference signals or increase a transmission rate, and may use orthogonal polarization signals in an environment where line of sight (LoS) transmission and reception are guaranteed.

Such the orthogonal polarization signals may be impaired in orthogonality in a multi-path environment. For example, when an RHCP signal passes through a multi-path channel and arrives at a receiver, an LHCP component may appear large. In addition, spoofing signals, jamming signals, and other system signals transmitted from the ground and passing through a multi-path channel may act as interference signals to the orthogonal polarization signals, thereby impairing the orthogonality of the orthogonal polarization signals. Such the interference signals may increase a reception error rate in the transceiving system including the satellite communication system and the satellite navigation system, decrease a transmission rate, and decrease accuracy of a navigation solution, thereby degrading the overall system performance.

For example, in the satellite navigation system, a spoofing signal and a jamming signal are maliciously intended interference signals, which may greatly reduce accuracy of a navigation solution or may make it impossible to derive a navigation solution. In the satellite navigation system, the multi-path signal and the unintentional interference signals of other system signals may greatly reduce the accuracy of the navigation solution or may make it impossible to derive the navigation solution. As another example, an intentional or unintentional interference signal received from another transceiving system in the communication system may increase an error rate and decrease a transmission rate, thereby causing performance degradation or making communications impossible. Accordingly, the communication systems (including satellite communication systems and terrestrial communication systems) and the satellite navigation system need to cancel the jamming signals, spoofing signals, multi-path signals, and interference signals of other system signals.

Figure 4:
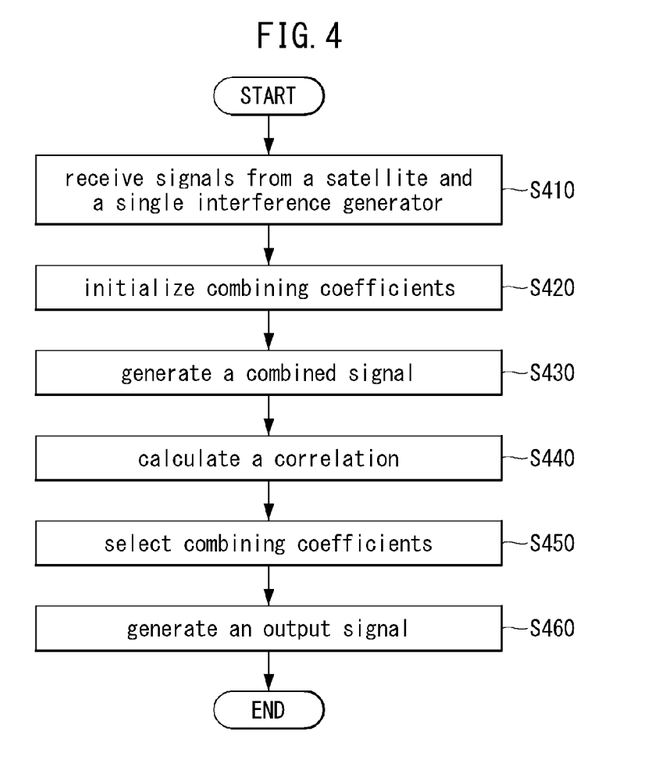
FIG. 4 is a flowchart illustrating a first exemplary embodiment of an interference signal cancellation method.

FIG. 4 is a flowchart illustrating a first exemplary embodiment of an interference signal cancellation method.

Referring to FIG. 4, in an interference signal cancelation method, a satellite may transmit a navigation signal including an RHCP navigation signal and an LHCP navigation signal to a communication node (e.g., terminal). In addition, a single interference generator that exists separately from the satellite may transmit an interference signal including an RHCP interference signal and an LHCP interference signal to the communication node (e.g., terminal). Here, although a single interference generator is configured for convenience of description, a plurality of interference generators may be used. In this case, a plurality of RHCP interference signals and a plurality of LHCP interference signals may be received by the communication node. Then, an interference signal cancellation apparatus included in the communication node (e.g., terminal) may receive a reception signal in which the navigation signal from the satellite and the interference signal from the single interference generator are combined (S410).

Here, the interference signal may be a malicious signal transmitted from the single interference generator as a jamming signal or spoofing signal. Alternatively, the interference signal may be a signal unintentionally generated from another transmission system. Also, the interference signal may be a partially distorted multi-path signal due to a delay by a multi-path channel in a single transceiving system. In addition, the interference signals may be partially distorted multi-path signals including attenuation due to a multi-path channel in a single transceiving system. In addition, the interference signal may be transmitted using orthogonal polarization. Alternatively, the interference signal may not use orthogonal polarization. In addition, the interference signal may be affected by a multi-path channel and may be received by the interference signal cancellation apparatus. Alternatively, the interference signal may be received without being affected by a multi-path channel.

The interference cancellation apparatus may initialize combining coefficients for combining an RHCP reception signal and an LHCP reception signal of a reception signal received from the satellite and the single interference generator by setting the combing coefficients to initial values (S420). Here, the initial values may be set by an administrator based on various experimental results. Accordingly, the interference signal cancellation apparatus may generate a combined signal by combining the RHCP reception signal and the LHCP reception signal using the combining coefficients (S430). Then, the interference signal cancellation apparatus may calculate a correlation between the combined signal and at least one of the received polarization signals (S440). Then, the interference signal cancellation apparatus may select combining coefficients that minimize the correlation (S450). Thereafter, the interference signal cancellation apparatus may generate an output signal by combining the RHCP reception signal and the LHCP reception signal using the selected combining coefficients (S460).

Figure 5:
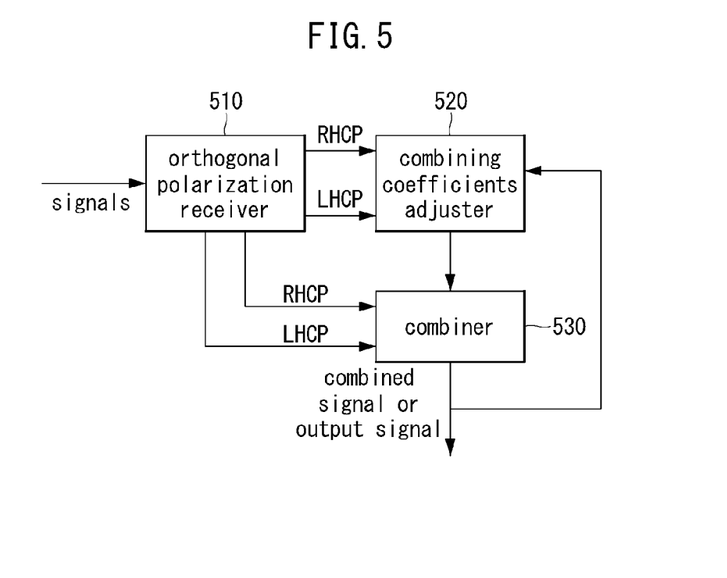
FIG. 5 is a block diagram illustrating a first exemplary embodiment of an interference signal cancellation apparatus.

FIG. 5 is a block diagram illustrating a first exemplary embodiment of an interference signal cancellation apparatus.

Referring to FIG. 5, an interference cancellation apparatus may include an orthogonal polarization receiver 510, a combining coefficient adjuster 520, and a combiner 530. Here, the orthogonal polarization receiver 510 may receive orthogonal polarization signals from the satellite and the single interference generator using a dual polarization antenna. In this case, the orthogonal polarization signals received by the orthogonal polarization receiver 510 may include a navigation signal transmitted by the satellite and an interference signal transmitted by the single interference generator. Here, for convenience of description, the interference signal may be assumed as a spoofing signal. In addition, it may be assumed that the interference signal generator transmits the interference signal using the same orthogonal polarization signals as the orthogonal polarization signals used by the satellite. In addition, it may be assumed that the orthogonality of the orthogonal polarization signals may be partially impaired by influences of a multi-path of the interference signals.

In addition, the orthogonal polarization receiver 510 may separate an RHCP reception signal and an LHCP reception signal from the received orthogonal polarization signals. The orthogonal polarization receiver 510 may provide the separated RHCP reception signal and LHCP reception signal to the combining coefficient adjuster 520 and the combiner 530. The orthogonal polarization receiver 510 may include at least one antenna and a radio frequency (RF) front end. Here, the antenna may be a dual polarization antenna. Alternatively, the antenna may be a plurality of orthogonally polarized antennas. The orthogonal polarization receiver 510 may be configured in an analog scheme, a digital scheme, or an analog and digital mixed scheme depending on an application.

Meanwhile, the combining coefficient adjuster 520 may receive the RHCP reception signal and the LHCP reception signal from the orthogonal polarization receiver 510. In addition, the combining coefficient adjuster 520 may inform the combiner 530 of the combining coefficients set as the initial values. Thereafter, the combining coefficient adjuster 520 may receive, from the combiner 530, a combined signal obtained by combining the RHCP reception signal and the LHCP reception signal using the combining coefficients set as the initial values. Then, the combining coefficient adjuster 520 may calculate a correlation with the combined signal using at least one of the RHCP reception signal and the LHCP reception signal. In addition, the combining coefficient adjuster 520 may select combining coefficients that minimize the calculated correlation. Thereafter, the combining coefficient adjuster 520 may provide the selected combining coefficients to the combiner 530. The combining coefficient adjuster 520 may be configured in an analog scheme, a digital scheme, or an analog and digital mixed scheme according to an application. Also, the combining coefficients may be linear combining coefficients or non-linear combining coefficients.

Then, the combiner 530 may receive the RHCP reception signal and the LHCP reception signal from the orthogonal polarization receiver 510, and may receive the combining coefficients set as the initial values (i.e., initial combining coefficients) from the combining coefficient adjuster 520. Accordingly, the combiner 530 may generate a combined signal by linearly or non-linearly combining the RHCP reception signal and the LHCP reception signal using the initial combining coefficients, and output the combined signal to the combining coefficient adjuster 520. Thereafter, the combiner 530 may receive combining coefficients selected from the combining coefficient adjuster 520 to minimize the correlation between the combined signal and at least one of the RHCP reception signal and the LHCP reception signal. Accordingly, the combiner 530 may generate and output an output signal by linearly or non-linearly combining the RHCP reception signal and the LHCP reception signal using the selected combining coefficients (i.e., final combining coefficients). The combiner 530 may be configured in an analog scheme, a digital scheme, or an analog and digital mixed scheme according to an application.

The operation of the interference signal cancellation apparatus will be described in detail as follows.

First, the orthogonal polarization receiver 510 may receive a reception signal including an RHCP reception signal and an LHCP reception signal at a time t from the satellite and the single interference generator. In this case, the RHCP reception signal and the LHCP reception signal received by the orthogonal polarization receiver 510 from the satellite and the single interference generator at the time t may be $x_R(t)$ and $x_L(t)$, respectively. The reception signal including the RHCP reception signal and the LHCP reception signal may include the navigation signal transmitted from the satellite and the interference signal transmitted by the single interference generator. Here, a signal (combined signal or output signal) output by the combiner 530 to cancel the interference signal, which is generated by combining the RHCP reception signal and the LHCP reception signal using combining coefficients, may be referred to as $x_M(t)$. In this case, the output signal may include the RHCP reception signal and the LHCP reception signal, and may be expressed as Equation 1 or 2 below.

$$x_M(t) = x_R(t) + w_L x_L(t) \quad \text{[Equation 1]}$$

Here, $w_L$ may be an LHCP combining coefficient, and may be expressed as $w_L Ce^{-j\varphi}$. Here, C may be a magnitude of the LHCP combining coefficient, and $\varphi$ may be a phase of the LHCP combining coefficient.

$$x_M(t) = w_R x_R(t) + w_L x_L(t) \quad \text{[Equation 2]}$$

Here, $w_R$ may be an RHCP combining coefficient, and may be expressed as $w_R = Ce^{-j\varphi_R}$. Here, $C_R$ may be a magnitude of the RHCP combining coefficient, and $\varphi_R$ may be a phase of the RHCP combining coefficient.

Here, $w_L$ may be the LHCP combining coefficient, and may be expressed as $w_L = Ce^{-j\varphi_L}$. Here, $C_L$ may be a magnitude of the LHCP combining coefficient, and $\varphi_L$ may be a phase of the LHCP combining coefficient.

On the other hand, there may be N satellites, and it may be assumed that the single interference generator transmits a spoofing signal to deceive M navigation signals out of those of the N satellites. Each of N and M may be a natural number. Then, an RHCP signal received by the interference signal cancellation apparatus may be expressed as Equation 3 below, and an LHCP signal received by the interference signal cancellation apparatus may be expressed as Equation 4 below.

$$x_R(t) = \sum_{n=1}^{N} A_{R,n} e^{-i\theta_{R,n}} S_n(t) + B_R e^{-i\phi_R} \sum_{m=1}^{M} J_m(t) + n_R \quad \text{[Equation 3]}$$

$$x_L(t) = \sum_{n=1}^{N} A_{L,n} e^{-i\theta_{L,n}} S_n(t) + B_L e^{-i\phi_R} \sum_{m=1}^{M} J_m(t) + n_L \quad \text{[Equation 4]}$$

Here, $S_n(t)$ may be a navigation signal transmitted by a satellite n, and n may be one of 1 to N. $j_m(t)=S_m(t-\tau)$ may be a spoofing signal transmitted by the single interference generator to deceive a navigation signal of a satellite m, and m may be one of 1 to M. In addition, $A_{R,n}$ may be a magnitude of an RHCP navigation signal received by the interference signal cancellation apparatus from the satellite n, and $\theta_{R,n}$ may be a phase thereof. Also, $A_{L,n}$ may be a magnitude of the LHCP navigation signal received by the interference signal cancellation apparatus from the satellite n, and $B_{L,n}$ may be a phase thereof. In this case, $A_{R,n}$, $\theta_{R,n}$, $A_{L,n}$, and $B_{L,n}$ may be affected by a transmitter of the satellite, a radio channel state, and the orthogonal polarization receiver 510. Also, $B_R$ may be a magnitude of an RHCP interference signal received by the interference signal cancellation apparatus from the single interference generator, and $\phi_R$ may be a phase thereof. Also, $B_L$ may be a magnitude of an LHCP interference signal received by the interference signal cancellation apparatus from the single interference generator, and $\phi_L$ may be a phase thereof. In this case, $B_R$, $\phi_R$, $B_L$, and $\phi_L$ may be affected by the single interference generator, the radio channel state, and the orthogonal polarization receiver 510. In such the situation, the orthogonal polarization receiver 510 may receive the navigation signal $S_n(t)$ from the satellite in a state in which orthogonality is impaired. In addition, the single interference generator may transmit the spoofing signal using orthogonal polarization. Alternatively, the single interference generator may transmit the spoofing signal using non-orthogonal polarization. The orthogonal polarization receiver 510 may receive the spoofing signal $J_m(t)=S_m(t-\tau)$ from the single interference generator in a state in which orthogonality is impaired. $n_R$ and $n_L$ may be white noises.

On the other hand, the orthogonal polarization receiver 510 may separate the RHCP reception signal and the LHCP reception signal received from the satellite and the single interference generator, and provide them to the combining coefficient adjuster 520. Then, the combining coefficient adjuster 520 may inform the combiner 530 of the initial values of the combining coefficients to initialize the combining coefficients. Thereafter, the combining coefficient adjuster 520 may receive, from the combiner 530, a combined signal obtained by combining the RHCP reception signal and the LHCP reception signal using the combining coefficients set as the initial values. Then, the combining coefficient adjuster 520 may select combining coefficients that minimize the correlation with the combined signal by calculating the correlation with the combined signal using the RHCP reception signal as in Equation 5.

$$\min_{C,\varphi} \frac{1}{T} \left| \sum_{t=t_0}^{t_0+T} x_M(t) x_R^*(t) \right| \quad \text{[Equation 5]}$$

$$\text{s.t. } x_M(t) = x_R(t) + Ce^{-j\varphi} x_L(t)$$

Here, $x_R^*(t)$ may be a conjugate signal of the RHCP reception signal. Also, 'min' may be an operator that selects combining coefficients that minimize the correlation. When random variables of white noises $n_R$ and $n_L$ of a reception channel of the RHCP reception signal and the LHCP reception signal are independent of each other, the value $$\frac{1}{T} \left| \sum_{t=t_0}^{t_0+T} n_L(t) n_R^*(t) \right|$$

can be made very small. Accordingly, the interference signal cancellation apparatus may effectively cancel a signal such as a spoofing signal having a power greater than a desired signal but smaller than noise, which is difficult to cancel.

On the other hand, although the combining coefficient adjuster 520 adjusts the magnitudes of the combining coefficients when selecting the combining coefficients in Equation 5, it may adjust only the phases of the combining coefficients as shown in Equation 6.

$$\min_{C,\varphi} \frac{1}{T} \left| \sum_{t=t_0}^{t_0+T} x_M(t) x_R^*(t) \right| \quad \text{[Equation 6]}$$

$$\text{s.t. } x_M(t) = x_R(t) + Ce^{-j\varphi} x_L(t)$$

That is, the combining coefficient adjuster 520 may receive, from the combiner 530, a combined signal obtained by combining the RHCP reception signal and the LHCP reception signal using the combining coefficients set as the initial values. In addition, the combining coefficient adjuster 520 may select phases of the combining coefficients that minimize the correlation with the combined signal by calculating the correlation with the combined signal using the RHCP reception signal.

Meanwhile, in Equation 5 and Equation 6, the combining coefficient adjuster 520 calculates the correlation with the combined signal or the output signal using the RHCP reception signal. However, the combining coefficient adjuster 520 may calculate the correlation by comparing a sum of the RHCP reception signals during a predetermined period and a sum of the LHCP reception signals during the predetermined period, and using a polarization signal having a larger sum.

$$\min_{C,\varphi} \frac{1}{T} \left| \sum_{t=t_0}^{t_0+T} x_M(t) x_R^*(t) \right| \quad \text{[Equation 7]}$$

$$\text{s.t. } x_M(t) = x_R(t) + Ce^{-j\varphi} x_L(t)$$

$$x_{RL}(t) = \begin{cases} x_R(t), & \text{when } \sum |x_R(t)| \geq \sum |x_L(t)| \\ x_L(t), & \text{else} \end{cases}$$

Here, when comparing the sum of the RHCP reception signals during the predetermined period and the sum of the LHCP reception signals during the predetermined period, $x_{RL}^*(t)$ may represent a polarization reception signal having a larger sum. As described above, the combining coefficient adjuster 520 may receive, from the combiner 530, the combined signal obtained by combining the RHCP reception signal and the LHCP reception signal using the combining coefficients set as the initial values. In addition, the combining coefficient adjuster 520 may compare the sum of the RHCP reception signals during the predetermined period with the sum of the LHCP reception signals during the predetermined period. As a result of the comparison, if the sum of the RHCP reception signals during the predetermined period is greater than or equal to the sum of the LHCP reception signals during the predetermined period, the combining coefficient adjuster 520 may calculate a correlation with the combined signal using the RHCP reception signal, and select combining coefficients that minimize the correlation. On the other hand, As a result of the comparison, if the sum of the RHCP reception signals during the predetermined period is smaller than the sum of the LHCP reception signals during the predetermined period, the combining coefficient adjuster 520 may calculate a correlation with the combined signal using the LHCP reception signal, and select combining coefficients that minimize the correlation.

As described above, if the combining coefficient adjuster 520 compares the RHCP reception signal with the LHCP reception signal and selects a signal for calculating the correlation with the combined signal, when an orthogonal polarization component of the interference signal is dominantly received in either the RHCP reception signal or the LHCP reception signal, optimal combining coefficients may be effectively derived.

On the other hand, although the combining coefficient adjuster 520 adjusts the magnitudes of the combining coefficients when selecting the combining coefficients in Equation 7, it may adjust only the phases of the combining coefficients as shown in Equation 8.

$$\min_{\varphi} \frac{1}{T} \left| \sum_{t=t_0}^{t_0+T} x_M(t) x_R^*(t) \right| \quad \text{[Equation 8]}$$

$$\text{s.t. } x_M(t) = x_R(t) + Ce^{-j\varphi} x_L(t)$$

$$x_{RL}(t) = \begin{cases} x_R(t), & \text{when } \left| \sum |x_R(t)| \geq \sum |x_L(t)| \right| \\ x_L(t), & \text{else} \end{cases}$$

That is, the combining coefficient adjuster 520 may receive, from the combiner 530, the combined signal obtained by combining the RHCP reception signal and the LHCP reception signal using the combining coefficients set as the initial values. In addition, the combining coefficient adjuster 520 may compare the sum of the RHCP reception signals during the predetermined period with the sum of the LHCP reception signals during the predetermined period. As a result of the comparison, if the sum of the RHCP reception signals during the predetermined period is greater than or equal to the sum of the LHCP reception signals during the predetermined period, the combining coefficient adjuster 520 may calculate a correlation with the combined signal by using the RHCP reception signal to select phases of the combining coefficients that minimize the correlation. On the other hand, as a result of the comparison, if the sum of the RHCP reception signals during the predetermined period is less than the sum of the LHCP reception signals during the predetermined period, the combining coefficient adjuster 520 may calculate a correlation with the combined signal using the LHCP reception signal to select phases of the combining coefficients that minimize the correlation.

As a method for the combining coefficient adjuster 520 to select the combining coefficients that minimize the correlation in Equations 5 to 8, Newton's method or methods modified therefrom, convex optimization or methods of applying it, or the like may be used. In addition, since the number of correlation values and a range of the values are not large in Equations 5 to 8, the combining coefficient adjuster 520 may select the combining coefficients by using a brute-force scheme. Although the exemplary embodiments of the present disclosure in Equations 5 to 8 have been mainly described for a case where signals desired to be received are transmitted/received using the RHCP signals, it is not intended to limit the present disclosure, and the exemplary embodiments of the present disclosure may include a case where transmission/reception is performed using polarization signals other than the RHCP signals. In this case, the combined signal or the output signal $x_M(t)$ may be expressed as shown in Equation 9 below.

$$x_M(t) = Ce^{-j\varphi} x_R(t) + x_L(t) \quad \text{[Equation 9]}$$

On the other hand, although the combining coefficient adjuster 520 selects the combining coefficients that minimize the correlation in Equations 5 to 8, it may select combining coefficients having a correlation less than a threshold (i.e., $\gamma_{th}$) as shown in Equation 10.

$$\frac{1}{M} \left| \sum x_M(t) x_{RL}^*(t) \right| < \gamma_{th} \quad \text{[Equation 10]}$$

$$\text{s.t. } x_M(t) = x_R(t) + Ce^{-j\varphi} x_L(t)$$

$$x_{RL}(t) = \begin{cases} x_R(t), & \text{when } \sum |x_R(t)| \geq \sum |x_L(t)| \\ x_L(t), & \text{else} \end{cases}$$

That is, the combining coefficient adjuster 520 may receive, from the combiner 530, the combined signal obtained by combining the RHCP reception signal and the LHCP reception signal using the combining coefficients set as the initial values. In addition, the combining coefficient adjuster 520 may compare the sum of the RHCP reception signals during the predetermined period with the sum of the LHCP reception signals during the predetermined period. As a result of the comparison, if the sum of the RHCP reception signals during the predetermined period is greater than or equal to the sum of the LHCP reception signals during the predetermined period, the combining coefficient adjuster 520 may calculate a correlation with the combined signal using the RHCP reception signal, and select combining coefficients that make the correlation equal to or less than the threshold.

On the other hand, as a result of the comparison, if the sum of the RHCP reception signals during the predetermined period is less than the sum of the LHCP reception signals during the predetermined period, the combining coefficient adjuster 520 may calculate a correlation with the combined signal using the LHCP reception signal, and select combining coefficients that make the correlation equal to or less than the threshold. When the combining coefficient adjuster 520 selects the combining coefficients making the correlation less than the threshold, there may be an advantage in that the combining coefficients may be selected quickly.

Here, the threshold may be appropriately set by the administrator based on various experimental results.

Meanwhile, another example of a method for the combining coefficient adjuster 520 to select the combining coefficients may be a combination of Equations 5 to 10. Also, although Equation 1 is used for calculating the combined signal or the output signal when the combining coefficient adjuster 520 selects the combining coefficients, but Equation 2 or Equation 9 may be used.

Meanwhile, the combiner 530 may receive, from the combining coefficient adjuster 520, the combining coefficients minimizing the correlation between the combined signal and at least one of the RHCP reception signal and the LHCP reception signal. Accordingly, the combiner 530 may generate and output an output signal by linearly or non-linearly combining the RHCP reception signal and the LHCP reception signal using the selected combining coefficients.

Here, the interference signal cancellation apparatus may be a pre-processing device of the transceiving system. In this case, the interference signal cancellation apparatus may be configured as an analog, digital, or analog-digital mixed device according to an application. In addition, the interference signal cancellation apparatus may be implemented inside the existing transceiving system. In this case, the interference signal cancellation apparatus may be configured as an analog, digital, or analog-digital mixed device according to an application.

Figure 6:
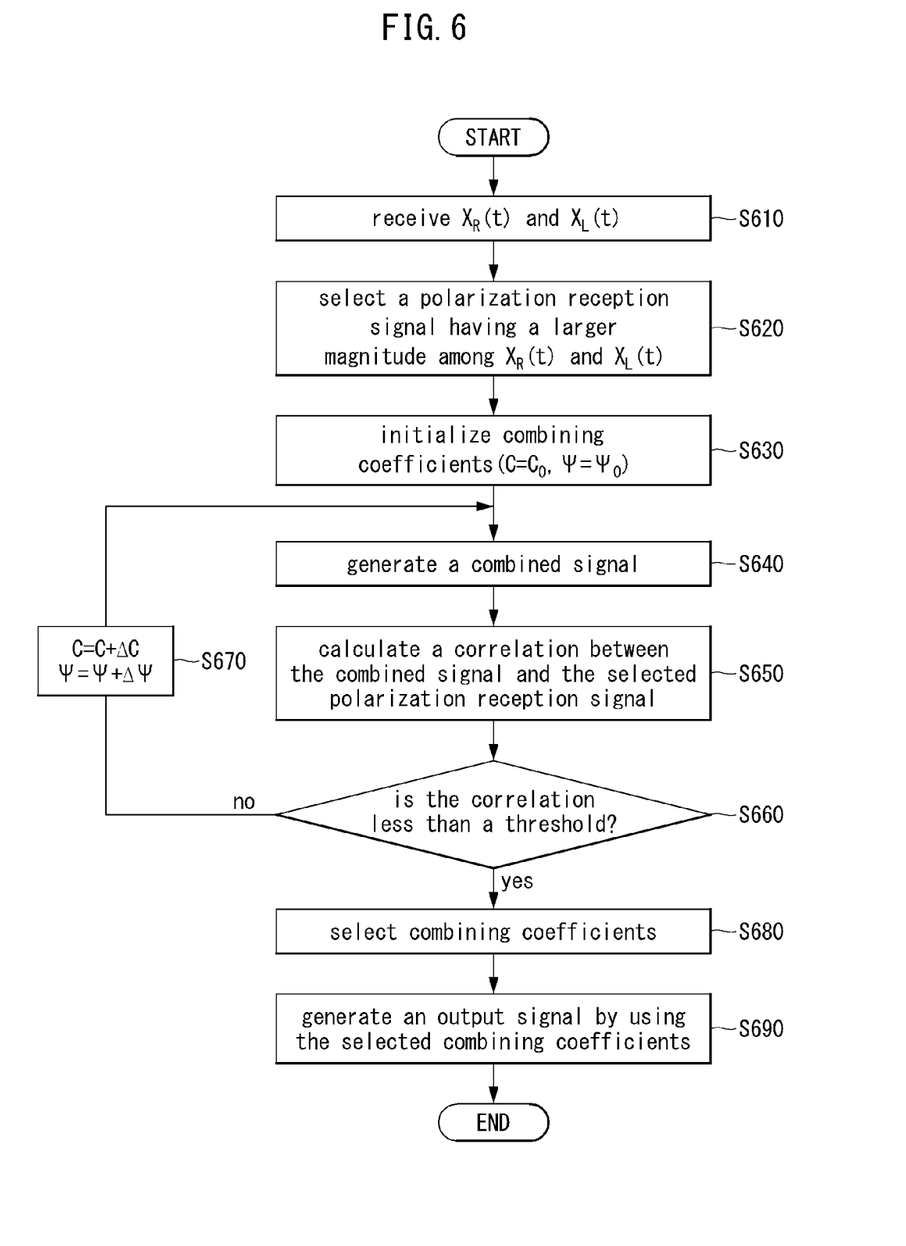
FIG. 6 is a flowchart illustrating a second exemplary embodiment of an interference signal cancellation method.

FIG. 6 is a flowchart illustrating a second exemplary embodiment of an interference signal cancellation method.

Referring to FIG. 6, in an interference signal cancellation method, the satellite may transmit a navigation signal including an RHCP navigation signal and an LHCP navigation signal to the terminal. In addition, the single interference generator may transmit an interference signal including an RHCP interference signal and an LHCP interference signal to the terminal. Then, an interference signal cancellation apparatus included in the terminal may receive, from the satellite and the single interference generator, a reception signal that is a sum of an RHCP reception signal $x_R(t)$ into which the RHCP navigation signal and the RHCP interference signal are combined and an LHCP reception signal $x_L(t)$ into which the LHCP navigation signal and the LHCP interference signal are combined (S610). Here, the interference signal may be a malicious signal transmitted from the single interference generator as a jamming signal or a spoofing signal. Alternatively, the interference signal may be a signal that is unintentionally generated from another transmission system. In addition, the interference signal may be a partially distorted multi-path signal due to a delay by a multi-path channel in a single transceiving system. In addition, the interference signal may be a partially distorted multi-path signal including attenuation by a multi-path channel in a single transceiving system. Also, the interference signal may be transmitted using orthogonal polarization. Alternatively, the interference signal may not use orthogonal polarization. In addition, the interference signal may be affected by a multi-path channel and may be received by the interference signal cancellation apparatus. Alternatively, the interference signal may be received without being affected by the multi-path channel.

Meanwhile, the interference signal cancellation apparatus may select a larger polarization reception signal by comparing magnitudes of the RHCP reception signal and the LHCP reception signal received from the satellite and the single interference generator (S620). In this case, the interference signal cancellation apparatus may select a larger polarization reception signal by comparing a sum of the RHCP reception signals during a predetermined period and a sum of the LHCP receptions signals during the predetermined period.

Thereafter, the interference signal cancellation apparatus may set a magnitude C of combining coefficients for combining the RHCP reception signal and the LHCP reception signal as an initial magnitude Co, and set a phase p of the combining coefficients as an initial phase value $\varphi_0$ to set the combining coefficients having initial values (i.e., initial combining coefficients) (S630). Here, the initial combining coefficients may be set by the administrator based on various experimental results. Thereafter, the interference signal cancellation apparatus may generate a combined signal by combining the RHCP reception signal and the LHCP reception signal using the initial combining coefficients (S640). Then, the interference signal cancellation apparatus may calculate a correlation between the selected reception signal and the combined signal (S650). Then, the interference signal cancellation apparatus may determine whether the correlation is less than a threshold (i.e., $\gamma_{th}$) (S660).

As a result of the determination, if the correlation is not less than the threshold, the interference signal cancellation apparatus may update the magnitude of the combining coefficients by adding a small positive real number $\Delta_C$ to the magnitude C of the combining coefficients, and may update the phase of the combining coefficients by adding a small positive real number $\Delta_\varphi$ to the phase $\varphi$ of the combining coefficients (S670). Thereafter, the interference signal cancellation apparatus may repeat from the step S640. On the other hand, as a result of the determination, if the correlation is less than the threshold, the interference signal cancellation apparatus may select combining coefficients (i.e., final combining coefficients) corresponding thereto (S660). Thereafter, the interference signal cancellation apparatus may generate an output signal by combining the RHCP reception signal and the LHCP reception signal using the selected combining coefficients (i.e., final combining coefficients) (S690).

Figure 7:
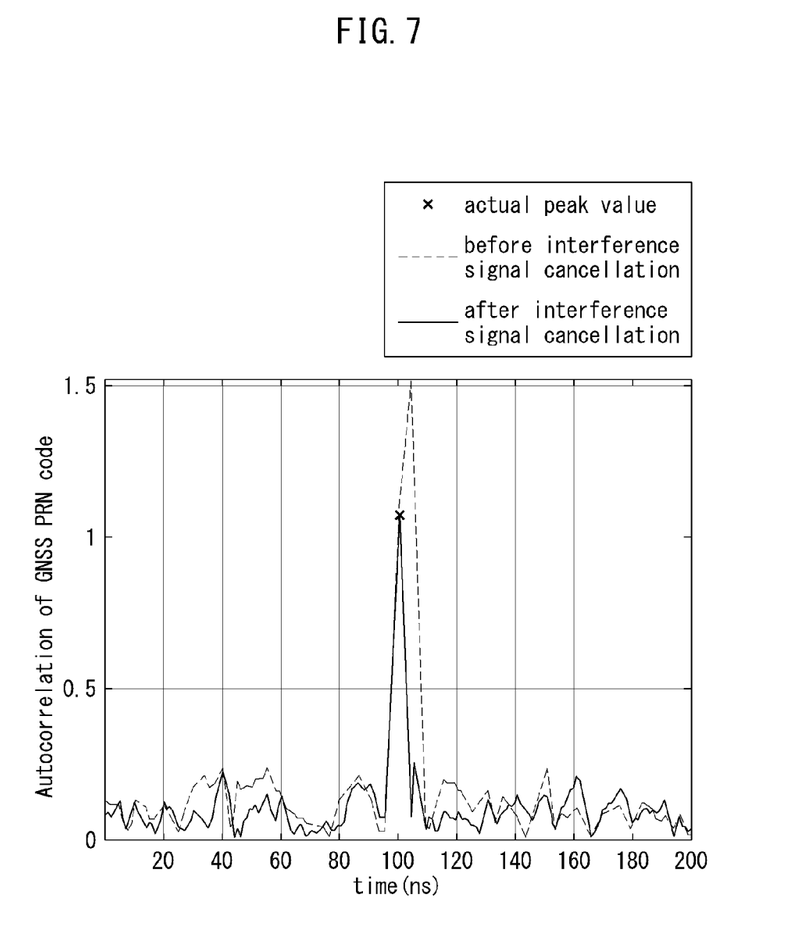
FIG. 7 is a graph illustrating interference cancellation performance of an interference signal cancellation apparatus with respect to a spoofing signal.

FIG. 7 is a graph illustrating interference cancellation performance of an interference signal cancellation apparatus with respect to a spoofing signal.

Referring to FIG. 7, the horizontal axis may represent a time, and the vertical axis may represent an autocorrelation value of a global navigation satellite system (GNSS) pseudorandom noise (PRN) code. A spoofing signal may be a chip-delayed by a shift of 0.8 chip. In FIG. 7, a dotted line may indicate an autocorrelation value of the GNSS PRN code before the interference signal cancellation apparatus cancels the interference signal, and a solid line may indicate an autocorrelation value of the GNSS PRN code after the interference signal cancellation apparatus cancels the interference signal. In addition, x may indicate a peak value of a navigation signal transmitted from the satellite to the interference signal cancellation apparatus.

In FIG. 7, before the interference signal cancellation apparatus cancels the spoofing signal, the peak value of autocorrelation may be formed on the right side shifted by 0.8 chip from an actual peak position. Therefore, the interference signal cancellation apparatus may derive an erroneous navigation solution by deception based on the spoofing signal. On the other hand, when the interference signal cancellation apparatus cancels the spoofing signal in FIG. 7, the peak value of autocorrelation may be formed at the actual peak position. In addition, the spoofing interference signal may be canceled well, since the spoofing signal has a very small autocorrelation at a time at which the peak of the autocorrelation is located.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of cancelling interference signals, performed by a communication node, the method comprising:
   receiving, from a transmitting communication node, a first polarization signal including an interference signal and a second polarization signal that is orthogonal to the first polarization signal and includes the interference signal;
   generating a combined signal by combining the first polarization signal and the second polarization signal using initial combining coefficients;
   multiplying the combined signal by one of a first conjugate signal of the first polarization signal and a second conjugate signal of the second polarization signal;
   calculating a correlation between the combined signal and one of the first polarization signal and the second polarization signal based on a result of the multiplying;
   selecting final combining coefficients based on the correlation; and
   generating an output signal by combining the first polarization signal and the second polarization signal using the final combining coefficients.

2. The method according to claim 1, wherein the first polarization signal is a right hand circular polarization (RHCP) signal, and the second polarization signal is a left hand circular polarization (LHCP) signal.

3. The method according to claim 1, wherein the first polarization signal is a vertical polarization signal, and the second polarization signal is a horizontal polarization signal.

4. The method according to claim 1, wherein the interference signal includes at least one of a jamming signal, a spoofing signal, a multi-path signal, an interference signal from another system, and combinations thereof.

5. The method according to claim 1,
   wherein the calculating of the correlation comprises:
   selecting a polarization signal having a larger magnitude by comparing magnitudes of the first polarization signal and the second polarization signal; and
   calculating the correlation between the selected polarization signal and the combined signal.

6. The method according to claim 1,
   wherein the selecting of the final combining coefficients comprises:
   comparing the correlation with a threshold; and
   in response to the correlation being less than the threshold, determining the initial combining coefficients as the final combining coefficients.

7. The method according to claim 6, wherein the selecting of the final combining coefficients further comprises:
   in response to the correlation being greater than or equal to the threshold, calculating first updated combining coefficients by updating the initial combining coefficients;
   generating a first updated combined signal by updating the combined signal using the first updated combining coefficients;
   generating a first updated correlation by updating the correlation using the first updated combined signal;
   comparing the first updated correlation with the threshold; and
   in response to the first updated correlation being less than the threshold, determining the first updated combining coefficients as the final combining coefficients.

8. The method according to claim 7, wherein the selecting of the final combining coefficients further comprises:
   in response to the first updated correlation being greater than or equal to the threshold, calculating second updated combining coefficients by updating the first updated combining coefficients;
   generating a second updated combined signal by updating the first updated combined signal using the second updated combining coefficients;
   generating a second updated correlation by updating the first updated correlation using the second updated combined signal;
   comparing the second updated correlation with the threshold; and
   in response to the second updated correlation being less than the threshold, determining the second updated combining coefficients as the final combining coefficients.

9. An apparatus for interference signal cancellation in a communication node, the apparatus comprising:
   a processor;
   a memory configured to electronically communicate with the processor; and
   instructions stored in the memory,
   wherein when executed by the processor, the instructions cause the apparatus to:
   receive, from a transmitting communication node, a first polarization signal including an interference signal and a second polarization signal that is orthogonal to the first polarization signal and includes the interference signal;
   generate a combined signal by combining the first polarization signal and the second polarization signal using initial combining coefficients;
   multiply the combined signal by one of a first conjugate signal of the first polarization signal and a second conjugate signal of the second polarization signal;
   calculate a correlation between the combined signal and one of the first polarization signal and the second polarization signal based on a result of the multiplying;

select final combining coefficients based on the correlation; and generate an output signal by combining the first polarization signal and the second polarization signal using the final combining coefficients.

10. The apparatus according to claim 9, wherein the first polarization signal is a right hand circular polarization (RHCP) signal, and the second polarization signal is a left hand circular polarization (LHCP) signal.

11. The apparatus according to claim 9, wherein the interference signal includes at least one of a jamming signal, a spoofing signal, a multi-path signal, an interference signal from another system, and combinations thereof.

12. The apparatus according to claim 9, wherein in the calculating of the correlation, the instructions further cause the apparatus to:

select a polarization signal having a larger magnitude by comparing magnitudes of the first polarization signal and the second polarization signal; and calculate the correlation between the selected polarization signal and the combined signal.

13. The apparatus according to claim 9, wherein in the selecting of the final combining coefficients, the instructions further cause the apparatus to:

compare the correlation with a threshold; and in response to the correlation being less than the threshold, determine the initial combining coefficients as the final combining coefficients.

14. The apparatus according to claim 13, wherein in the selecting of the final combining coefficients, the instructions further cause the apparatus to:

in response to the correlation being greater than or equal to the threshold, calculate first updated combining coefficients by updating the initial combining coefficients;

generate a first updated combined signal by updating the combined signal using the first updated combining coefficients;

generate a first updated correlation by updating the correlation using the first updated combined signal;

compare the first updated correlation with the threshold; and in response to the first updated correlation being less than the threshold, determine the first updated combining coefficients as the final combining coefficients.

* * * * *